G. WEAVER.
SPRING WHEEL.
APPLICATION FILED JUNE 28, 1913.
1,088,386.
Patented Feb. 24, 1914.
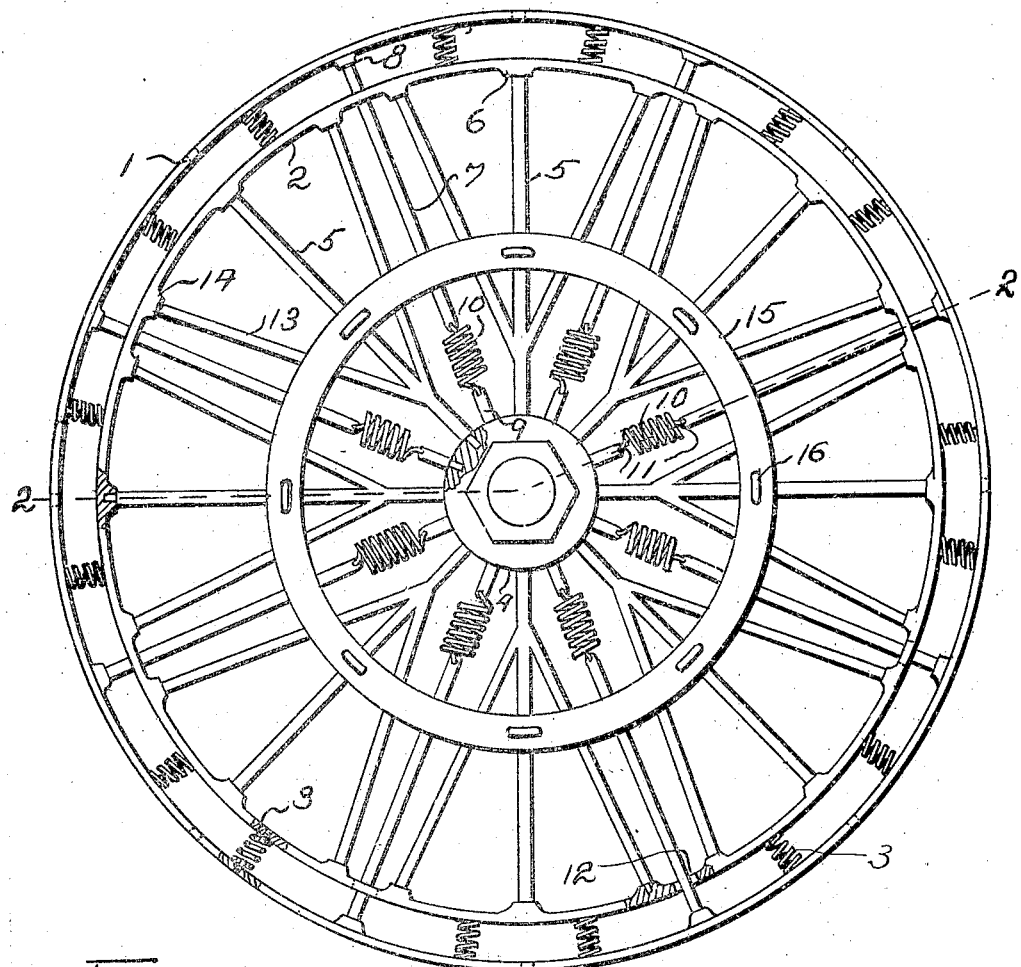
Fig. 1.
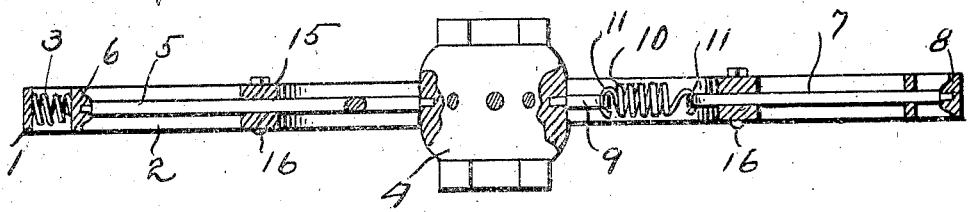
Fig. 2.
Witnesses
Francis Mac Nerbary
Rodney H. Smith
Inventor
Gabe Weaver,
By
Attorney

UNITED STATES PATENT OFFICE.

GABE WEAVER, OF JELLICO, TENNESSEE.

SPRING-WHEEL.

1,088,386.  Specification of Letters Patent.  Patented Feb. 24, 1914.

Application filed June 28, 1913. Serial No. 776,422.

*To all whom it may concern:*

Be it known that I, GABE WEAVER, a citizen of the United States, residing at Jellico, in the county of Campbell and State of Tennessee, have invented certain new and useful Improvements in Spring-Wheels, of which the following is a specification.

This invention comprehends certain new and useful improvements in spring wheels and relates more particularly to devices which are particularly designed for use upon automobiles or vehicles of a similar nature.

The primary object of the invention resides in the provision of a wheel of this type having an outer rim, an inner rim connected thereto by means of a plurality of expansive spiral springs, a hub, rigid spokes connecting said hub and inner rim, and spring spokes connecting the hub and outer rim.

Another object of the invention is to provide a spring wheel which shall be of extremely simple construction, cheap to manufacture, strong, durable, and easy to assemble.

The invention also aims to generally improve wheels of this nature to render them more useful and commercially desirable.

With these and other objects in view, as will become more apparent as the description proceeds, the invention consists in certain novel features of construction, combination and arrangement of parts, as will be hereinafter fully described and claimed.

For a complete understanding of my invention, reference is to be had to the following description and accompanying drawings, in which, Figure 1 is a side elevation of my improved spring wheel, and, Fig. 2 is a sectional view taken upon the plane of line 2—2 of Fig. 1.

In the following description and accompanying drawings, similar parts will be referred to and designated by like reference characters.

Referring to the drawings by numerals, 1 designates an outer rim, 2 an inner rim, and 3 a plurality of expansive spiral springs, having their ends threaded into the opposed surfaces of said rims. The outer rim 1 is formed with a plurality of openings 1' adapted to receive fastening members for a tire, not shown. A hub 4 is rigidly connected to the inner rim 2, by means of a plurality of spokes 5, the outer ends of which are seated within the sockets 6 integrally formed upon said inner rim. The outer rim 1 is connected to the hub 4 by means of a plurality of spring spokes comprising outer section 7 rigidly secured within sockets 8 formed upon the outer rim, inner sections 9 rigidly secured to the hub, and expansive spiral springs 10 which connect the free ends of said inner and outer spoke sections. The opposed ends of the spoke sections 7 and 9 are formed with circular apertures which receive the hooked ends 11 of the spiral springs 10. The outer portions 7 of the spring spokes work through circumferential slots 12 formed in the inner rim. Brace rods 13 are secured at their outer ends in the sockets 14 formed upon the inner rim 2, and are connected at their inner ends to the rigid spokes 5, whereby the latter are reinforced. It will be noted that the brace rods 13 are connected in pairs to the spokes 5 and that the rods opposing each pair converge inwardly. To further strengthen my improved wheel so as to prevent lateral movement of the hub 4 relative to the rims 1 and 2, I provide the circular brace bands 15, which are connected to each other upon opposite sides of the spokes and brace bars, by means of the fastenings 16. Each of the fastenings 16 encircles one of the spokes 5, thereby securely positioning the brace bands.

The foregoing description will suffice for a clear understanding of the construction of my improved wheel, the operation of which is as follows: A downward pressure upon the hub 4 tends to compress those expansive springs 3 which happen to be nearest to the ground and to expand the spiral springs 10 which are positioned diametrically opposite the first mentioned springs. The slight movement of the hub and inner rim relative to the outer rim, is provided for by the circumferential slots 12. It will thus be seen that all jars incidental to rough roads are absorbed by the expansive and contractile springs.

While I have shown and described the preferred embodiment of my invention, I do not wish to be limited to this exact construction and arrangement of parts, but may make such changes as will fall within the scope and spirit of the invention.

Having thus described my invention what I claim is:—

A spring wheel comprising an outer rim, an inner rim, expansive spiral springs connecting said inner and outer rims, a hub, a plurality of rigid spokes connecting the hub and inner rim, a pair of outwardly divergent brace rods connected at their inner ends to each of said spokes and at their outer ends to the inner rim, said inner rim being formed with a plurality of circumferential slots between each set of brace rods, a plurality of spring spokes connecting the outer rim to the hub, each of said spring spokes comprising a relatively long outer section fixed to the outer rim and passing through one of said slots, a relatively short inner section fixed to the hub and a spring connection between said sections; and a pair of annular brace bands positioned upon opposite sides of the wheel, and means connecting said bands to the rigid spokes and to one another, the bands crossing the rigid spokes, brace rods and the outer sections of the spring spokes.

In testimony whereof I affix my signature in presence of two witnesses.

GABE WEAVER.

Witnesses:
D. T. JENKINS,
STEPHEN SMITH.

Copies of this patent may be obtained for five cents each, by addressing the "Commissioner of Patents, Washington, D. C."